US012321547B2

(12) United States Patent
Kim et al.

(10) Patent No.: US 12,321,547 B2
(45) Date of Patent: Jun. 3, 2025

(54) TOUCH DISPLAY DEVICE

(71) Applicant: LG Display Co., Ltd., Seoul (KR)

(72) Inventors: KiYong Kim, Paju-si (KR); Hyunkyu Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/460,248

(22) Filed: Sep. 1, 2023

(65) Prior Publication Data

US 2024/0152231 A1   May 9, 2024

(30) Foreign Application Priority Data

Nov. 7, 2022 (KR) .................. 10-2022-0147065

(51) Int. Cl.
*G06F 3/041* (2006.01)
*G06F 3/044* (2006.01)

(52) U.S. Cl.
CPC ...... *G06F 3/04166* (2019.05); *G06F 3/04164* (2019.05); *G06F 3/044* (2013.01)

(58) Field of Classification Search
CPC ... G06F 3/04166; G06F 3/04164; G06F 3/044
See application file for complete search history.

(56) References Cited

U.S. PATENT DOCUMENTS

2017/0046006 A1* 2/2017 Kim .................. G06F 3/0443
2019/0121484 A1* 4/2019 Zhang ................. G06F 3/044
2020/0210025 A1* 7/2020 Kim .................. G06F 3/0443
2021/0200413 A1* 7/2021 Jang ................. G06F 3/04182
2022/0066594 A1* 3/2022 Shim ................ G06F 3/04182
2022/0342500 A1* 10/2022 Su ..................... G06F 3/0443

FOREIGN PATENT DOCUMENTS

CN          106855762 A  *  6/2017

OTHER PUBLICATIONS

Intellectual Property Office of the United Kingdom, Combined Search and Examination Report, United Kingdom Patent Application No. GB2313087.5, Feb. 13, 2024, eight pages.

* cited by examiner

*Primary Examiner* — Ke Xiao
*Assistant Examiner* — Jennifer L Zubajlo
(74) *Attorney, Agent, or Firm* — Fenwick & West LLP

(57) ABSTRACT

A touch display device and a display panel are disclosed. The touch display device comprises a display panel including touch electrodes arranged into touch blocks, each of the touch blocks including a respective portion of the touch electrodes; touch lines including touch block lines connected to the touch blocks and touch electrode lines connected to the touch electrodes; and a touch driving circuit configured to sense a touch of a touch block from the touch blocks based on a first touch signal received from a touch block line from the touch block lines that is connected to the touch block, and sense a touch of a touch electrode from the touch electrodes included in the touch block based on a second touch signal received from a touch electrode line from the touch electrode lines that is connected to the touch electrode.

23 Claims, 12 Drawing Sheets

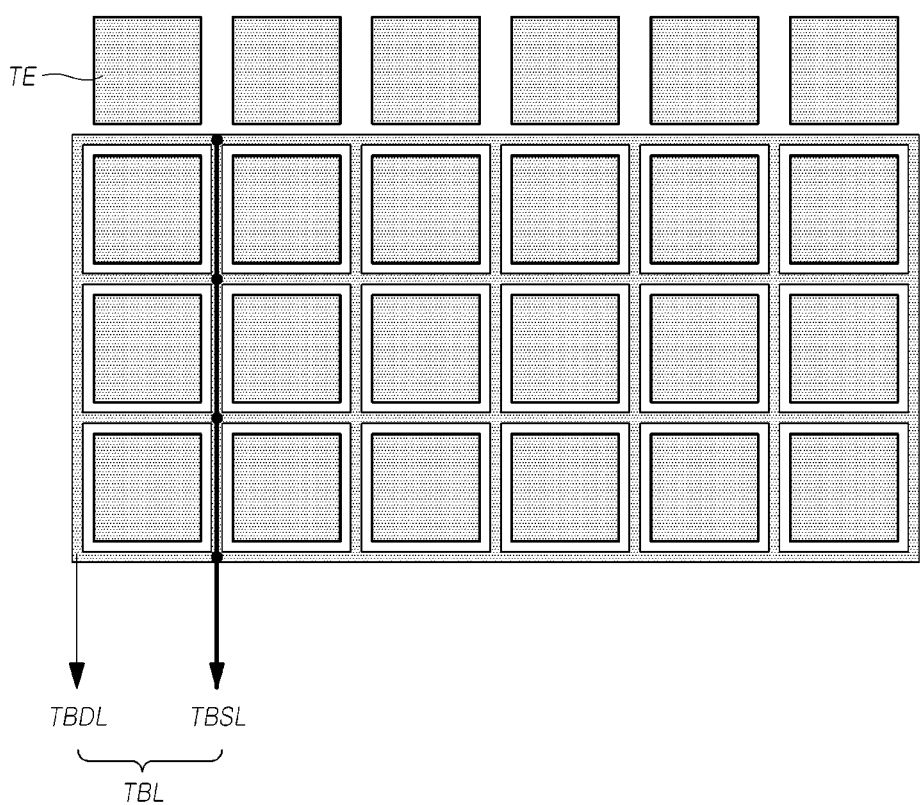

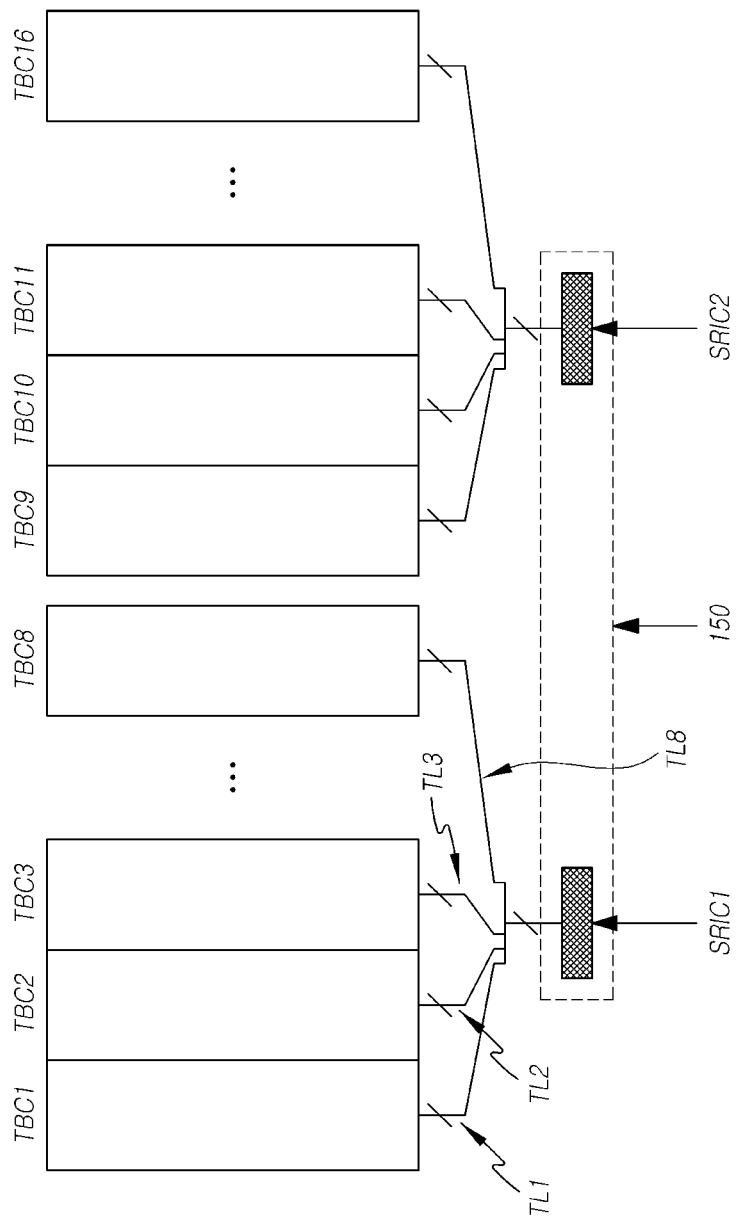

TOUCH DISPLAY DEVICE

CROSS-REFERENCE TO RELATED APPLICATION

This application claims priority from Republic of Korea Patent Application No. 10-2022-0147065, filed on Nov. 7, 2022, which is hereby incorporated by reference in its entirety.

BACKGROUND

Field

Embodiments of the disclosure relate to a touch display device and a display panel, and more particularly, to a touch display device and a display panel capable of reducing the number of touch lines and enhancing touch sensing performance.

Description of Related Art

With the development of multimedia, the importance of flat panel display devices is increasing. In response, flat panel display devices, such as liquid crystal displays, plasma display panels, and organic light emitting displays, have been commercialized.

Also in wide use are touch display devices having a touch panel stacked on a display device, which may detect the point touched by the user's hand or a stylus pen when an electrical characteristic, such as resistance or capacitance, is changed at the touch point, output information corresponding to the touch point, or perform calculation.

Such a touch display device is a user interface and has increasing application to, e.g., small portable terminals, office devices, mobile devices, and the like.

However, as the touch display device has a separate touch panel stacked, it has many drawbacks, such as an increased thickness, reduced light transmittance, and increased manufacturing costs. To address such issues, advanced in-cell touch (AIT)-type display devices are proposed which have built-in touch electrodes inside the pixel areas of the display panel.

As the number of touch electrodes disposed on the display panel in the touch display device increases, touch performance is enhanced. However, an increase in the number of touch electrodes leads to an increase in the number of touch lines for supplying touch signals to the touch electrodes and an increase in the number of touch driving circuits.

This issue increases in large-screen display panels, increasing the costs of touch display devices and making it difficult to sense many touch electrodes in the touch driving time.

SUMMARY

Accordingly, a touch display device and a display panel capable of reducing the number of touch lines and enhancing touch sensing performance are disclosed.

Embodiments of the disclosure may provide a touch display device and a display panel which may reduce the number of touch lines and enhance touch sensing performance by dividing the display panel into a plurality of touch blocks and disposing touch block lines for driving the touch blocks and touch electrode lines for driving the touch electrodes in the touch blocks.

Embodiments of the disclosure may provide a touch display device and a display panel which may secure a sufficient touch sensing time and enhance touch sensing performance by driving the touch block lines for driving the touch blocks and the touch electrode lines for driving the touch electrodes in the touch blocks.

In one embodiment, a touch display device comprises: a display panel including a plurality of touch electrodes arranged into a plurality of touch blocks, each of the plurality of touch blocks including a respective portion of the plurality of touch electrodes; a plurality of touch lines including a plurality of touch block lines connected to the plurality of touch blocks and a plurality of touch electrode lines connected to the plurality of touch electrodes; and a touch driving circuit configured to sense a touch of a touch block from the plurality of touch blocks based on a first touch signal received from a touch block line from the plurality of touch block lines that is connected to the touch block, and sense a touch of a touch electrode from the plurality of touch electrodes included in the touch block based on a second touch signal received from a touch electrode line from the plurality of touch electrode lines that is connected to the touch electrode.

In one embodiment, a touch display device comprises: a display panel including a plurality of touch blocks comprising a first touch block including a first plurality of touch electrodes and a second touch block including a second plurality of touch electrodes; a first touch block detection element at least partially around the first plurality of touch electrodes included in the first touch block; a first touch block signal line connected to the first touch block detection element; a plurality of touch electrode lines, each touch electrode line connected to a touch electrode from the first plurality of touch electrodes and a touch electrode from the second plurality of touch electrodes; and a touch driving circuit configured to sense a touch of the first touch block based on a first touch signal received from the first touch block signal line, and sense a touch of a first touch electrode from the first plurality of touch electrodes based on a second touch sensing signal received from a touch electrode line connected to the first touch electrode and a second touch electrode from the second plurality of touch electrodes.

In one embodiment, a method of sensing touch of a touch display device comprises: applying a first pulsed touch driving signal to a first touch block signal line during a touch sensing period of the touch display device, the first touch block signal line connected to a first touch block detection line that surrounds first touch electrodes included in a first touch block; applying a second pulsed touch driving signal to a second touch block signal line while the first pulsed touch driving signal is applied to the first touch block signal line during the touch sensing period, the second touch block signal line connected to a second touch block detection line that surrounds second touch electrodes included in a second touch block; applying a third pulsed touch driving signal to a touch electrode line that is connected to a first touch electrode included in the first touch electrodes and a second touch electrode included in the second touch electrodes during the touch sensing period; sensing a touch of at least one of the first touch block and the second touch block based on a first touch signal received from the first touch block signal line and a second touch signal received from the second touch block signal line during the touch sensing period; and sensing a touch of at least one of the first touch electrode and the second touch electrode during the touch sensing period.

According to embodiments of the disclosure, it is possible to provide a touch display device and a display panel capable of reducing the number of touch lines and enhancing touch sensing performance.

Further, according to embodiments of the disclosure, it is possible to reduce the number of touch lines and enhance touch sensing performance by dividing the display panel into a plurality of touch blocks and disposing touch block lines for driving the touch blocks and touch electrode lines for driving the touch electrodes in the touch blocks.

Further, according to embodiments of the disclosure, it is possible to secure a sufficient touch sensing time and enhance touch sensing performance by driving the touch block lines for driving the touch blocks and the touch electrode lines for driving the touch electrodes in the touch blocks.

BRIEF DESCRIPTION OF DRAWINGS

The above and other objects, features, and advantages of the disclosure will be more clearly understood from the following detailed description, taken in conjunction with the accompanying drawings, in which:

FIGS. 7A and 7B are views illustrating an example of a touch block line formed in a touch block in a touch display device according to embodiments of the disclosure;

FIG. 11 is a block diagram illustrating an example in which a plurality of touch block columns are sensed using one source-readout integrated circuit in a touch display device according to embodiments of the disclosure.

DETAILED DESCRIPTION

Figure 1:
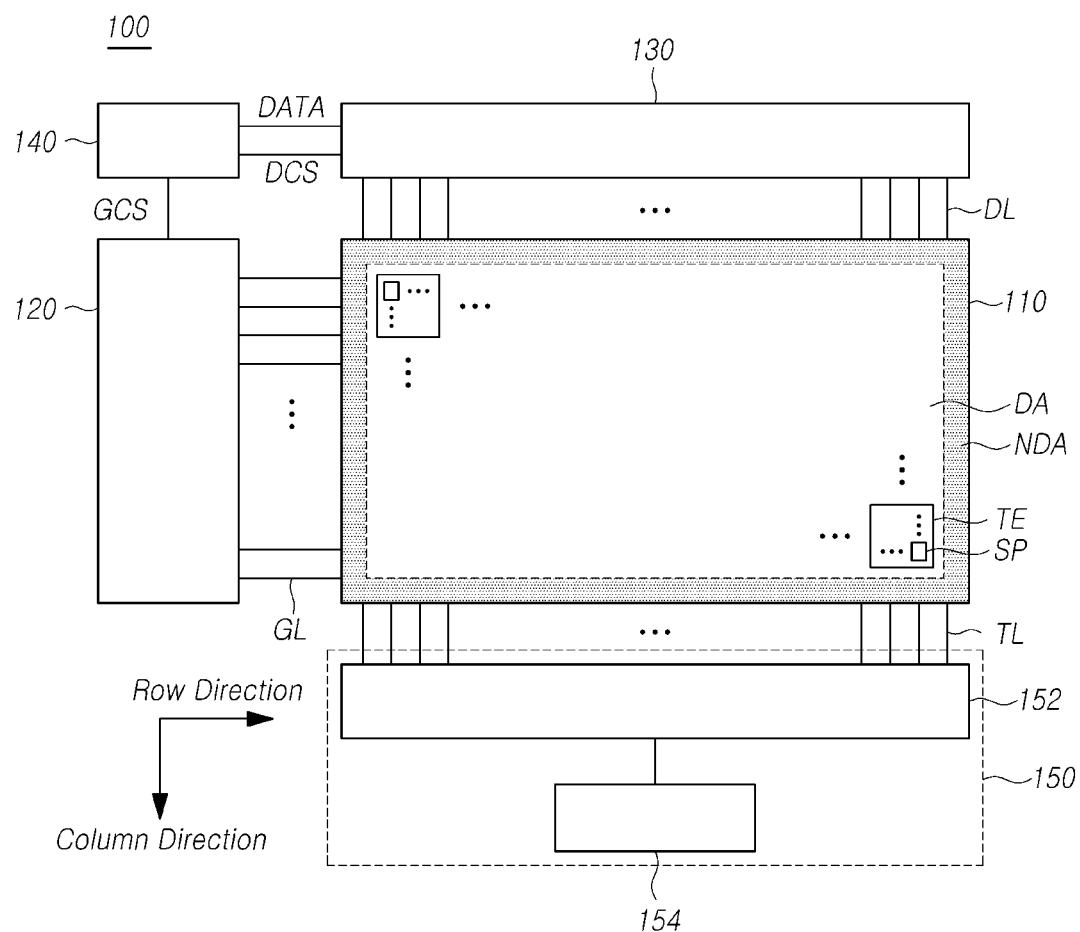
FIG. 1 is a view schematically illustrating a touch display device according to embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure will be described in detail with reference to the accompanying drawings.

FIG. 1 is a view schematically illustrating a configuration of a touch display device according to embodiments of the disclosure.

Referring to FIG. 1, a touch display device 100 according to embodiments of the disclosure may include a display panel 110, a data driving circuit 130, a gate driving circuit 120, and a timing controller 140 as components for displaying images.

The display panel 110 may include a display area DA in which images are displayed and a non-display area NDA in which images are not displayed.

The non-display area NDA may be an outer area of the display area DA and be referred to as a bezel area. The non-display area NDA may be an area visible from the front of the touch display device 100 or an area that is bent and not visible from the front of the touch display device 100.

The display panel 110 may include a plurality of subpixels SP. For example, the touch display device 100 may be various types of display devices including a liquid crystal display device, an organic light emitting display device, a micro light emitting diode (micro LED) display device, and a quantum dot display device.

The structure of each of the plurality of subpixels SP may vary according to the type of the touch display device 100. For example, when the touch display device 100 is a self-emission display device in which the subpixels SP emit light by themselves, each subpixel SP may include a light emitting element that emits light by itself, one or more transistors, and one or more capacitors.

The display panel 110 may further include various types of signal lines to drive the plurality of subpixels SP. For example, various types of signal lines may include a plurality of data lines DL transferring data signals (also referred to as data voltages or image data) and a plurality of gate lines GL transferring gate signals (also referred to as scan signals).

The plurality of data lines DL and the plurality of gate lines GL may cross each other. Each of the plurality of data lines DL may be disposed while extending in a column direction. Each of the plurality of gate lines GL may be disposed while extending in a row direction.

Here, the column direction and the row direction are relative. For example, the column direction may be a vertical direction and the row direction may be a horizontal direction. As another example, the column direction may be a horizontal direction and the row direction may be a vertical direction.

The data driving circuit 130 is a circuit for driving the plurality of data lines DL, and may output data signals to the plurality of data lines DL. The gate driving circuit 120 is a circuit for driving the plurality of gate lines GL, and may supply gate signals to the plurality of gate lines GL.

The timing controller 140 is a device for controlling the data driving circuit 130 and the gate driving circuit 120 and may control driving timings for the plurality of data lines DL and driving timings for the plurality of gate lines GL.

The timing controller 140 may supply various types of data driving control signals DCS to the data driving circuit 130 to control the data driving circuit 130 and may supply various types of gate driving control signals GCS to the gate driving circuit 230 to control the gate driving circuit 120.

The data driving circuit 130 may supply data voltages to the plurality of data lines DL according to the driving timing control by the timing controller 140. The data driving circuit 130 may receive digital image data DATA from the timing controller 140 and may convert the received image data DATA into analog data voltages and output them to the plurality of data lines DL.

The gate driving circuit 120 may supply gate signals to the plurality of gate lines GL according to the timing control of the timing controller 140. The gate driving circuit 120 may receive a first gate voltage corresponding to a turn-on level voltage and a second gate voltage corresponding to a turn-off level voltage, along with various gate driving control signals GCS, generate gate signals, and supply the generated gate signals to the plurality of gate lines GL. The turn-on level voltage may be a high level voltage, and the turn-off level voltage may be a low level voltage. Conversely, the turn-on level voltage may be a low level voltage, and the turn-off level voltage may be a high level voltage.

To provide a touch sensing function as well as an image display function, the touch display device 100 may include a touch panel and a touch driving circuit 150 that senses the touch panel to detect whether a touch occurs by a touch object, such as a finger or pen, or the position of the touch.

The touch driving circuit 150 may include a touch sensing circuit 152 that drives and senses the touch panel and generates and outputs touch sensing data and a touch controller 154 that may detect an occurrence of a touch or the position of the touch using touch sensing data.

The touch panel may include a plurality of touch electrodes TE as touch sensors. The touch panel may further include a plurality of touch lines TL for electrically connecting the plurality of touch electrodes TE and the touch sensing circuit 152. The touch panel or touch electrode TE is also referred to as a touch sensor.

The touch panel may exist outside or inside the display panel 110. When the touch panel exists outside the display panel 110, the touch panel is referred to as an external-type touch panel. When the touch panel is of the external type, the touch panel and the display panel 110 may be separately manufactured or may be combined. The external-type touch panel may include a substrate and a plurality of touch electrodes TE on the substrate.

When the touch panel exists inside the display panel 110, the touch panel is referred to as an internal-type touch panel. In the internal-type touch panel, the touch panel may be formed in the display panel 110 during a manufacturing process of the display panel 110.

The touch sensing circuit 152 may supply a touch driving signal to at least one of the plurality of touch electrodes TE and detect a touch sensing signal transferred from at least one touch electrode TE among the plurality of touch electrodes TE, generating touch sensing data.

The touch driving circuit 150 may perform touch sensing in a self-capacitance sensing scheme or a mutual-capacitance sensing scheme.

When the touch driving circuit 150 performs touch sensing in the self-capacitance sensing scheme, the touch driving circuit 150 may perform touch sensing based on capacitance between each touch electrode TE and the touch object (e.g., finger or pen).

When the touch driving circuit 150 performs touch sensing in the mutual-capacitance sensing scheme, the touch driving circuit 150 may perform touch sensing based on capacitance between the touch electrodes TE.

According to the mutual-capacitance sensing scheme, the plurality of touch electrodes TE are divided into driving touch electrodes and sensing touch electrodes. The touch sensing circuit 152 may drive the driving touch electrode by the touch driving signal and may detect the touch sensing signal from the sensing touch electrode.

According to the self-capacitance sensing scheme, each of the touch electrodes TE may serve both as a driving touch electrode and as a sensing touch electrode. The touch sensing circuit 152 may drive all or some of the plurality of touch electrodes TE and sense all or some of the plurality of touch electrodes TE.

The size of the touch electrode TE may correspond to the size of one subpixel SP and may correspond to the size of two or more subpixels SP. A touch electrode pattern composed of a plurality of touch electrodes TE may be designed in various shapes.

The touch electrode pattern may be a plate type without an opening or a mesh type with openings. When the touch electrode pattern is a plate type without an opening, the touch electrode TE may be a transparent electrode. When the touch electrode pattern is a mesh type having openings, all or some of the openings may correspond to the emission area of the subpixel SP.

The touch sensing circuit 152 and the touch controller 154 may be implemented as separate devices or as a single device.

Alternatively, the touch sensing circuit 152 and the data driving circuit 130 may be implemented as separate integrated circuits. Alternatively, the whole or part of the touch sensing circuit 152 and the whole or part of the data driving circuit 130 may be integrated into a single integrated circuit.

The touch display device 100 according to embodiments of the disclosure may be a self-emissive display device having self-emissive light emitting elements disposed on the display panel 110, such as an organic light emitting display device, a quantum dot display device, a micro LED display device, and the like.

Figure 2:
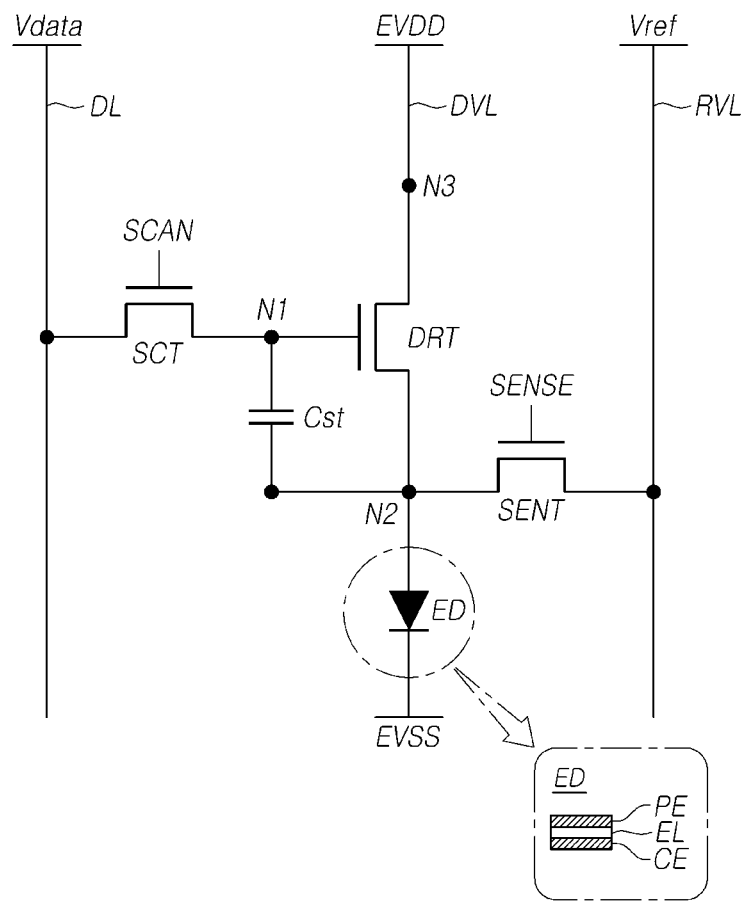
FIG. 2 is a view illustrating an example of a subpixel circuit of a touch display device according to embodiments of the disclosure.

FIG. 2 is a view illustrating an example of a subpixel circuit of a touch display device according to embodiments of the disclosure.

Referring to FIG. 2, a subpixel SP of the touch display device 100 according to embodiments of the disclosure may include a light emitting element ED, a driving transistor DRT for controlling the current flowing to the light emitting element ED to drive the light emitting element ED, a scan transistor SCT for transferring a data voltage Vdata to a first node N1 which is the gate node of the driving transistor DRT, and a storage capacitor for maintaining the voltage during a predetermined period.

In the touch display device 100 according to embodiments of the disclosure, each subpixel SP may further include a sense transistor SENT for an initialization operation and a sensing operation.

Since the subpixel SP exemplified herein has three transistors DRT, SCT, and SENT and one capacitor Cst to drive the light emitting element ED, the subpixel SP is referred to as having a 3T (transistor) 1C (capacitor) structure.

The light emitting element ED may include a pixel electrode PE and a common electrode CE, and a light emitting layer EL positioned between the pixel electrode PE and the common electrode CE. In the light emitting element ED, the pixel electrode PE may be an anode electrode, and the common electrode CE may be a cathode electrode. Or, the pixel electrode PE may be a cathode electrode, and the common electrode CE may be an anode electrode. The light emitting element ED may be an organic light emitting diode, a light emitting diode, or a quantum dot light emitting element, for example.

A base voltage EVSS may be applied to the common electrode CE of the light emitting element ED. The base voltage EVSS may be a ground voltage or a voltage similar to the ground voltage, for example.

The driving transistor DRT is a transistor for driving the light emitting element ED, and includes a first node N1, a second node N2, and a third node N3.

The first node N1 of the driving transistor DRT is a node corresponding to the gate node and may be electrically connected with the source node or drain node of the scan transistor SCT. The second node N2 of the driving transistor DRT may be electrically connected with the pixel electrode PE of the light emitting element ED and may be the source node or drain node. The third node N3 of the driving transistor DRT may be a node to which driving voltage EVDD is applied, be electrically connected with a driving voltage line DVL for supplying the driving voltage EVDD, and be the drain node or source node. Hereinafter, for convenience of description, in the example described below, the second node N2 of the driving transistor DRT may be a source node and the third node N3 may be a drain node.

In response to the scan signal SCAN supplied from a corresponding scan signal line among a plurality of scan signal lines which are a kind of the gate lines GL, the scan transistor SCT may control connection between the first node N1 of the driving transistor DRT and a corresponding data line DL among the plurality of data lines DL.

The drain node or source node of the scan transistor SCT may be electrically connected to a corresponding data line DL. The source node or drain node of the scan transistor SCT may be electrically connected to the first node N1 of the driving transistor DRT. The gate node of the scan transistor SCT may be electrically connected to the scan signal line, which is a kind of gate line GL, to receive the scan signal SCAN.

The scan transistor SCT may be turned on by the scan signal SCAN of a turn-on level voltage and transfer the data voltage Vdata supplied from the data line DL to the first node N1 of the driving transistor DRT.

The scan transistor SCT is turned on by the turn-on level scan signal SCAN and turned off by the turn-off level scan signal SCAN. When the scan transistor SCT is of the n type, the turn-on level may be a high level voltage, and the turn-off level may be a low level voltage. When the scan transistor SCT is of the p type, the turn-on level may be a low level voltage, and the turn-off level may be a high level voltage.

In response to the sense signal SENSE supplied from a corresponding sense signal line among a plurality of sense signal lines which are a kind of the gate lines GL, the sense transistor SENT may control connection between the second node N2 of the driving transistor DRT and a corresponding reference voltage line RVL among the plurality of reference voltage lines RVL.

The drain node or source node of the sense transistor SENT may be electrically connected to the reference voltage line RVL. The source node or drain node of the sense transistor SENT may be electrically connected to the second node N2 of the driving transistor DRT and may be electrically connected to the pixel electrode PE of the light emitting element ED. The gate node of the sense transistor SENT may be electrically connected to the sense signal line, which is a kind of gate line GL, to receive the sense signal SENSE.

The sense transistor SENT may be turned on by the turn-on level sense signal SENSE and transfer a reference voltage Vref supplied from the reference voltage line RVL to the second node N2 of the driving transistor DRT.

The sense transistor SENT is turned on by the turn-on level sense signal SENSE and turned off by the turn-off level sense signal SENSE. When the sense transistor SENT is of the n type, the turn-on level may be a high level voltage, and the turn-off level may be a low level voltage. When the sense transistor SENT is of the p type, the turn-on level may be a low level voltage, and the turn-off level may be a high level voltage.

The storage capacitor Cst may be electrically connected between the first node N1 and the second node N2 of the driving transistor DRT to maintain the data voltage Vdata corresponding to the image data during one frame time.

The storage capacitor Cst may be an external capacitor intentionally designed to be outside the driving transistor DRT, but not a parasitic capacitor (e.g., Cgs or Cgd) which is an internal capacitor present between the first node N1 and the second node N2 of the driving transistor DRT.

Each of the driving transistor DRT, the scan transistor SCT, and the sense transistor SENT may be an n-type transistor or a p-type transistor. All of the driving transistor DRT, the scan transistor SCT, and the sense transistor SENT may be n-type transistors or p-type transistors. At least one of the driving transistor DRT, the scan transistor SCT, and the sense transistor SENT may be an n-type transistor (or a p-type transistor), and the others may be p-type transistors (or n-type transistors).

The 3T1C structure of the subpixel SP exemplified herein is merely an example for description, and may further include one or more transistors or, in some cases, one or more storage capacitors. The plurality of subpixels SP may have the same structure, or some of the plurality of subpixels SP may have a different structure.

The touch display device 100 according to embodiments of the disclosure may have a top emission structure or a bottom emission structure. However, for convenience of description, an example in which the touch display device 100 according to embodiments of the disclosure has a bottom emission structure is described below.

Figure 3:
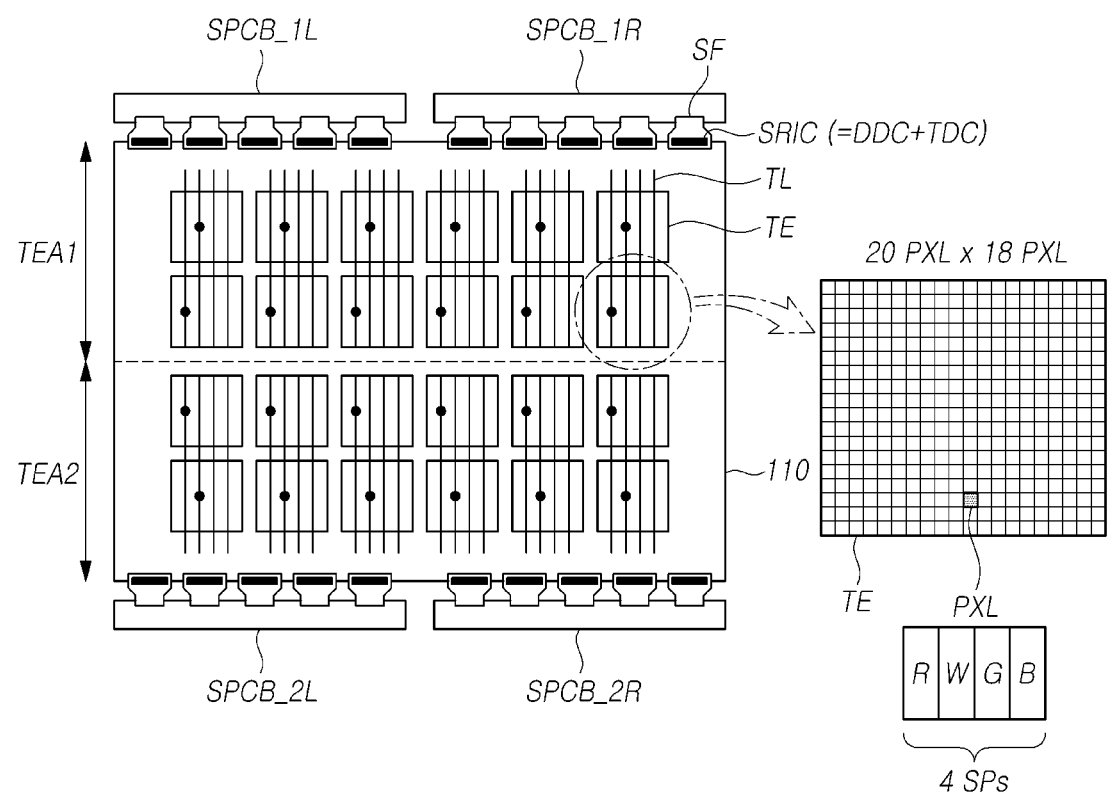
FIG. 3 is a view illustrating an example of a touch sensing system when a touch display device includes a large-scale display panel according to embodiments of the disclosure.

FIG. 3 is a view illustrating an example of a touch sensing system when a touch display device includes a large-scale display panel according to embodiments of the disclosure.

Referring to FIG. 3, in the touch display device 100 according to embodiments of the disclosure, the data driving circuit 130 may be divided into a plurality of data drivers DDC. Each of the plurality of data drivers DDC may drive different data lines DL.

The touch driving circuit 150 may include a plurality of touch drivers TDC. Each of the plurality of touch drivers TDC may be configured to drive and sense different touch electrodes TE.

The touch display device 100 according to embodiments of the disclosure may include a plurality of source-readout integrated circuits SRIC. Each of the plurality of source-readout integrated circuits SRIC may include a data driver DDC and a touch driver TDC. In other words, the source-readout integrated circuit SRIC may be referred to as an integrated circuit which combines a data driver DDC and a touch driver TDC.

When the display panel 110 is a large-scale one, the display panel 110 may be divided into a first touch driving area TEA1 and a second touch driving area TEA2. The first touch driving area TEA1 may correspond to an upper portion of the display panel 110 whereas the second driving area TEA2 may correspond to a lower portion of the display panel 110, in one embodiment.

The first touch driving area TEA1 of the display panel 110 may be connected to one or more first source printed circuit boards SPCB_1L and SPCB_1R through a plurality of circuit films SF. A first source-readout integrated circuit SRIC may be mounted on each of the plurality of circuit films SF.

The second touch driving area TEA2 of the display panel 110 may be connected to one or more second source printed circuit boards SPCB_2L and SPCB_2R through a plurality of circuit films SF. A source-readout integrated circuit SRIC may be mounted on each of the plurality of circuit films SF.

The touch electrodes TE disposed in the first touch driving area TEA1 of the display panel 110 may be driven and sensed by a plurality of first source-readout integrated circuits SRIC corresponding to the first touch driving area TEA1.

The touch electrodes TE disposed in the second touch driving area TEA2 of the display panel 110 may be driven and sensed by a plurality of second source-readout integrated circuits SRIC corresponding to the second touch driving area TEA2.

For example, one touch electrode TE disposed on the large display panel 110 may overlap the area occupied by pixels (20 PXL*18 PXL) disposed in 20 rows and 18 columns. Here, one pixel PXL may include four subpixels SP.

The four subpixels SP include a red subpixel R emitting red light, a white subpixel W emitting white light, a green subpixel G emitting green light, and a blue subpixel B emitting blue light.

Figure 4:
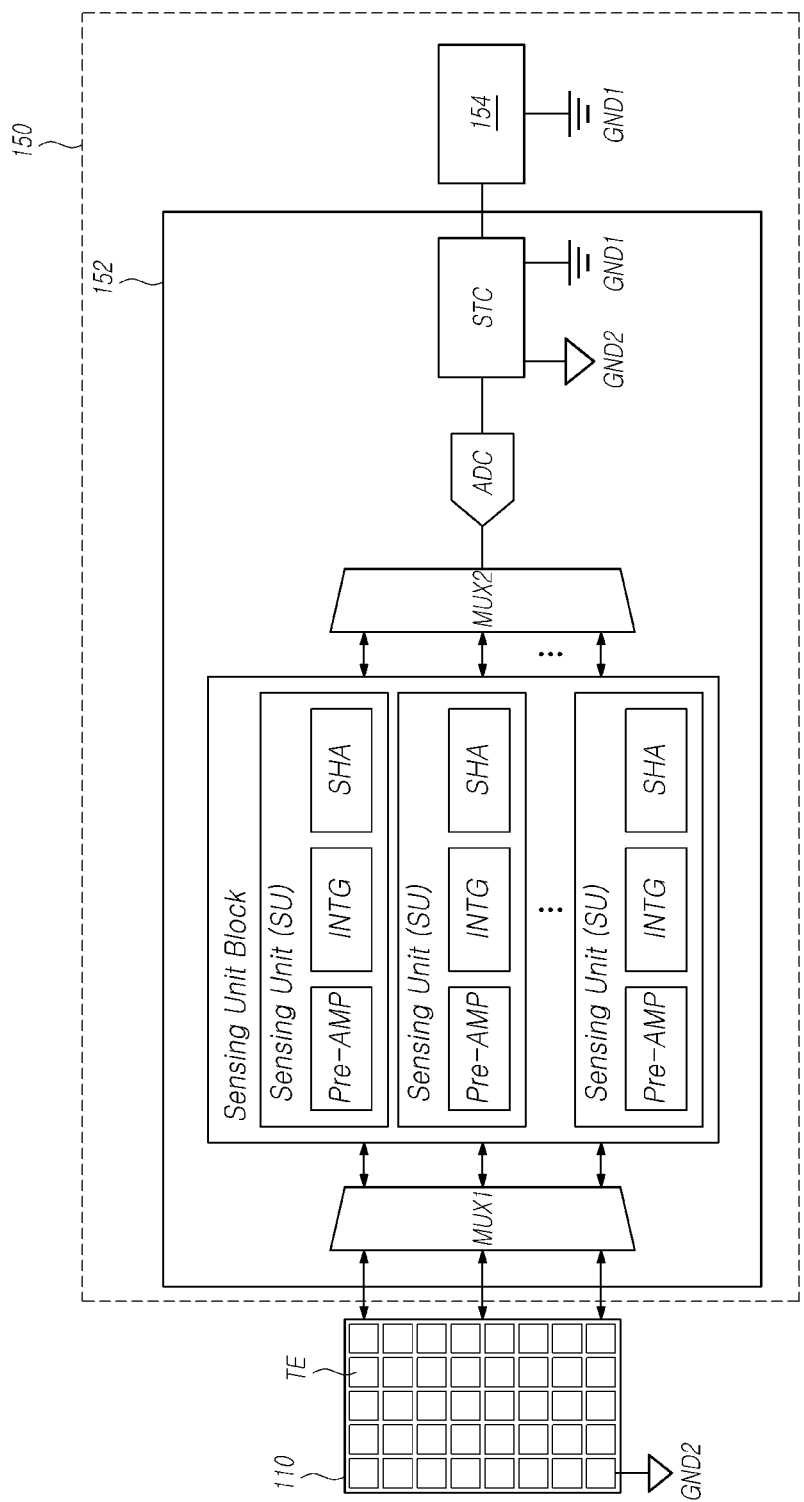
FIG. 4 is a view illustrating an example of a touch driving circuit of a touch display device according to embodiments of the disclosure.

FIG. 4 is a view illustrating an example of a touch driving circuit of a touch display device according to embodiments of the disclosure.

Referring to FIG. 4, the touch driving circuit 150 according to embodiments of the disclosure may include a first multiplexer circuit MUX1, a sensing unit block including a plurality of sensing units SU, a second multiplexer circuit MUX2, and an analog-to-digital converter ADC.

The first multiplexer circuit MUX1 may include one or more multiplexers. The second multiplexer circuit MUX2 may include one or more multiplexers.

Each sensing unit SU may include a pre-amplifier Pre-AMP, an integrator circuit INTG, and a sample-and-hold circuit SHA.

One pre-amplifier Pre-AMP may be electrically connected to one or more touch electrodes TE.

One pre-amplifier Pre-AMP may supply the touch driving signal TDS to one touch electrode TE selected as a sensing target among a plurality of connectable touch electrodes TE and receive the touch sensing signal from the touch electrode TE to which the touch driving signal TDS has been applied.

The received touch sensing signal may be amplified by the pre-amplifier Pre-AMP and input to the integrator INTG.

The pre-amplifier Pre-AMP and the integrator INTG may be integrated into a single circuit.

The integrator circuit INTG integrates the signals output from the pre-amplifier Pre-AMP.

The analog-to-digital converter ADC may supply touch sensing data, obtained by converting the integral value output from the integrator INTG into a digital value, to the touch controller 154.

The analog-to-digital converter ADC may output the touch sensing data to the touch controller 154 grounded to a first ground GND1.

The pre-amplifier Pre-AMP may receive the touch sensing signal from the touch electrode TE disposed on the display panel 110 grounded to a second ground GND2 different from the first ground GND1. When the touch driving circuit 150 is used, the touch sensing signal is received from the touch electrode TE disposed on the display panel 110 grounded to the second ground GND2, and the touch sensing data is output to the touch controller 154 grounded to the first ground GND1, so that touch sensing in the touch display device 100 having the two grounds GND1 and GND2 is possible.

Meanwhile, the touch driving circuit 150 according to embodiments of the disclosure may further include a signal transfer circuit STC for signal transfer with the touch controller 154. In this case, the signal transfer circuit STC included in the touch driving circuit 150 according to embodiments of the disclosure may be grounded to both the first ground GND1 and the second ground GND2.

Figure 5:
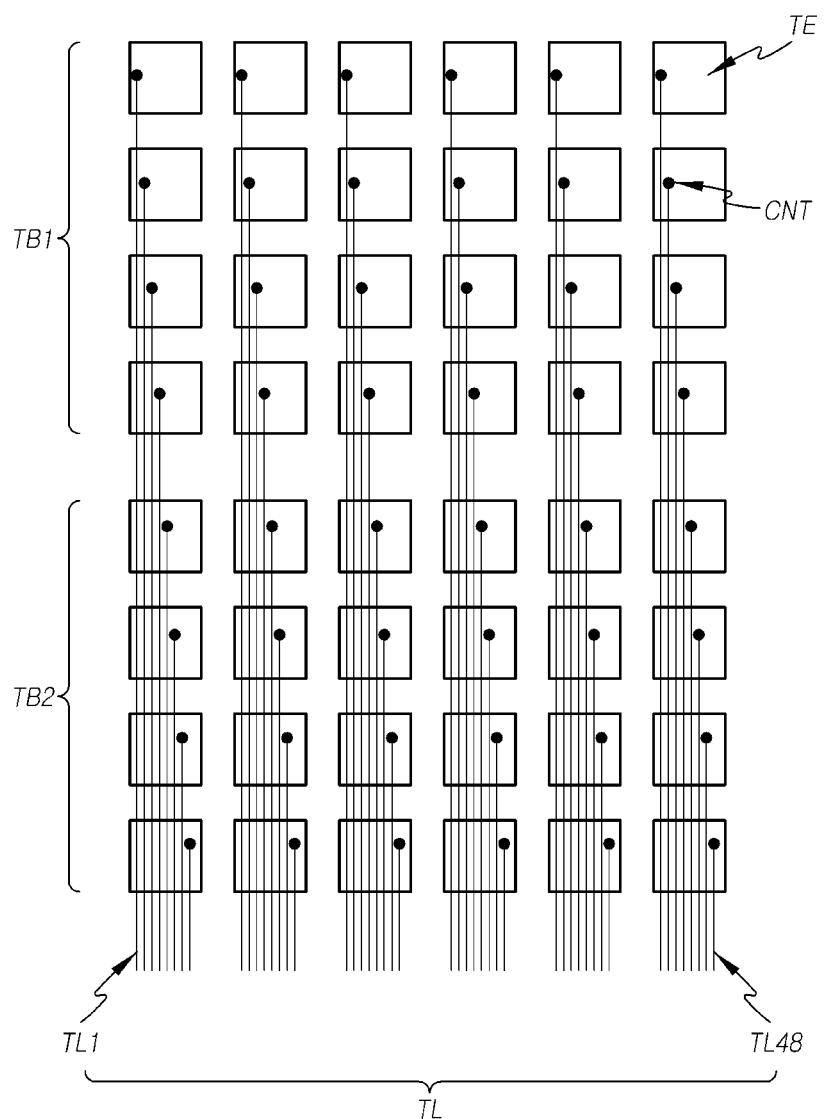
FIG. 5 is a view illustrating a conventional connection structure of a touch electrode and a touch line in a touch display device.

FIG. 5 is a view illustrating a conventional connection structure of a touch electrode and a touch line in a touch display device.

Referring to FIG. 5, the touch display device 100 has a matrix structure in which a plurality of touch electrodes TE having the same shape are separated from each other and may be disposed on the display panel 110.

When the touch electrodes TE having the same shape are disposed in a matrix structure on the display panel 110, the plurality of touch electrodes TE may be electrically connected with the touch line TL where the touch driving signal or touch sensing signal is transferred, through one or more contact holes CNT.

The plurality of touch electrodes TE may be positioned in the display area DA of the display panel 110. In some cases, some (e.g., the outermost touch electrodes) of the plurality of touch electrodes TE may be positioned in an area (outer area) outside the display area DA or extend up to the area (outer area) outside the display area DA. The display area DA may be an area where an image is displayed or an area where touch sensing is possible.

In this case, the plurality of touch lines TL electrically connected to the plurality of touch electrodes TE may be positioned in the display area DA. In some cases, all or some the touch lines TL may be positioned outside the display area DA. When the plurality of touch lines TL electrically connected to the plurality of touch electrodes TE are positioned in the display area DA, the plurality of touch lines TL may be positioned on a different layer from the plurality of touch electrodes TE and overlap the plurality of touch electrodes TE.

All of the plurality of touch lines TL may have the same or similar lengths and be disposed from points connected to the touch driving circuit 150 to the opposite points. Each of the plurality of touch lines TL may differ only in the position electrically connected to the corresponding touch electrode TE (i.e., the position of the contact hole CNT).

In the case of the display panel 110 in which the plurality of touch electrodes TE are disposed in a matrix structure, if one touch electrode TE is electrically connected to one touch line TL, as many touch lines TL as the number of touch electrodes TE will be required. The number of touch lines TL corresponds to the number of touch channels for transferring the touch sensing signal to the touch driving circuit 150.

In this case, the display panel 110 may be divided into a plurality of touch blocks.

For example, when one touch block TB1 or TB2 is composed of 4×6 touch electrodes TE, 24 touch lines TL are respectively connected to 24 touch electrodes TE disposed in one touch block TB1 or TB2. Accordingly, at least 24 touch channels are required for each touch block for touch sensing of one touch block TB1 or TB2.

When the touch block disposed on the display panel 110 is constituted of 6 rows in a vertical direction and 10 columns in a horizontal direction (6×10 array), 60 touch blocks may exist in the display panel 110, and a total of 1440 (24×60) touch lines TL may be required.

In this case, the touch driving circuit 150 positioned under the display panel 110 may include a plurality of source-readout integrated circuits SRIC. The touch line TL extending in the vertical direction may be electrically connected to a corresponding source-readout integrated circuit SRIC.

One source-readout integrated circuit SRIC may be connected to each column of the touch block. For example, when the touch block is disposed in 6 rows and 10 columns (6×10 array), 10 source-readout integrated circuits SRIC included in the touch driving circuit 150 may be connected with the touch lines TL extending from the touch blocks in each column.

In this case, as the number of touch electrodes TE increases, the number of touch lines TL and the number of multiplexers increase, increasing the manufacturing costs of the touch display device 100 and making it difficult to sense many touch electrodes TE within a predetermined touch driving time.

The touch display device 100 of the disclosure may reduce the number of touch lines and enhance touch sensing performance by using the touch block lines for sensing the plurality of touch blocks constituting the display panel 10 and the touch electrode lines for driving the touch electrodes in the touch blocks.

Figure 6:
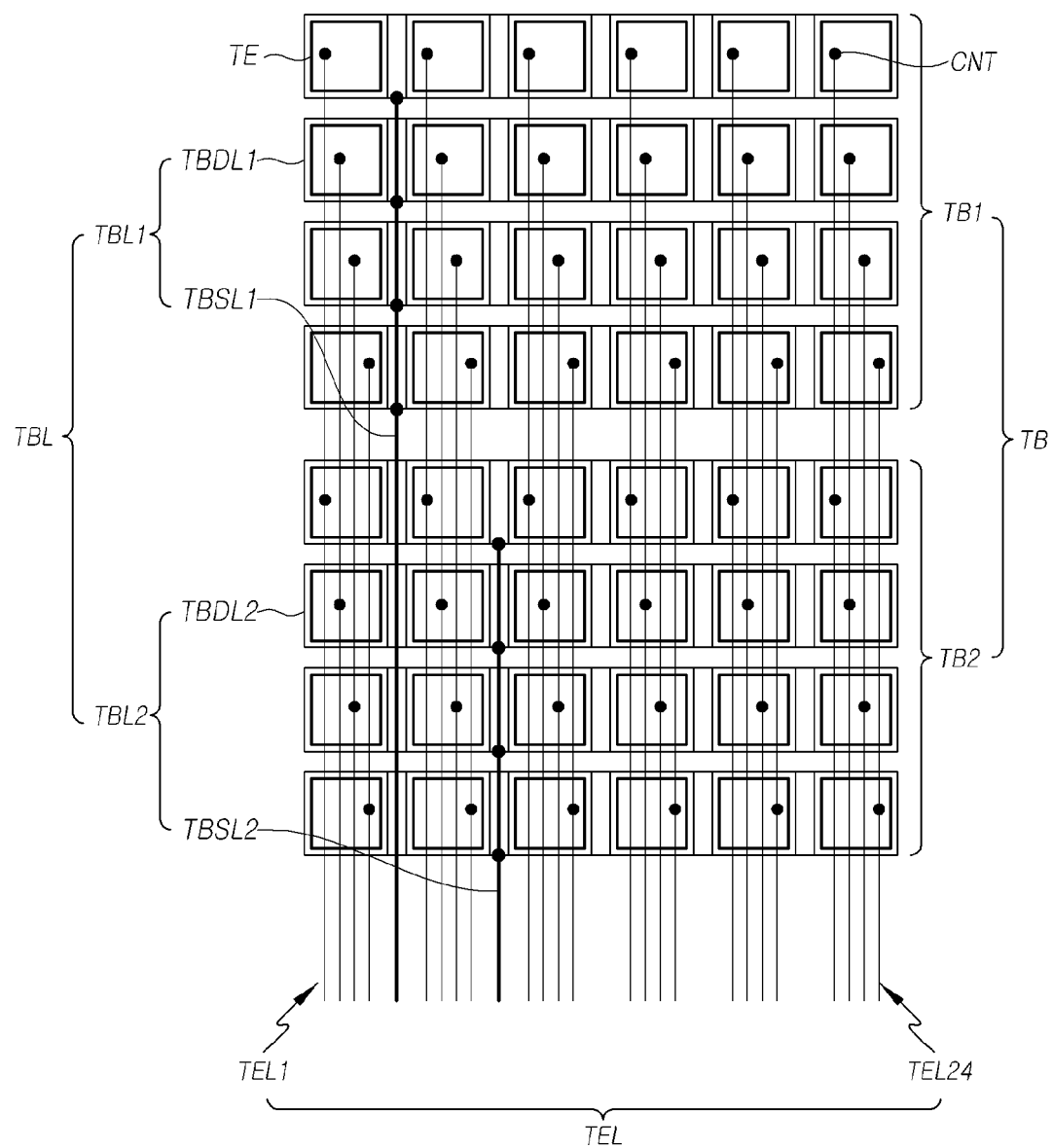
FIG. 6 is a view illustrating an example of a connection structure of a touch electrode and a touch line in a touch display device according to embodiments of the disclosure.

FIG. 6 is a view illustrating an example of a connection structure of a touch electrode and a touch line in a touch display device 100 according to embodiments of the disclosure.

Referring to FIG. 6, the touch display device 100 according to embodiments of the disclosure has a matrix structure in which a plurality of touch electrodes TE are separated from each other and may be disposed on the display panel 110. For example, in one touch block TB1 or TB2, four rows and six columns of touch electrodes TE may be disposed.

In the display device 100 of the disclosure, the touch lines may include a touch block line TBL for sensing a plurality of touch blocks TB in each block unit and a touch electrode line TEL for sensing the touch electrode TE in each touch block TB. The touch block line TBL and the touch electrode line TEL may be collectively referred to as a touch line.

For example, to sense a first touch block TB1, a first touch block line TBL1 and a touch electrode line TEL may be disposed.

The first touch block line TBL1 may include a first touch block detection line TBDL1 that surrounds all the touch electrodes disposed in the first touch block TB1 in a plan view of the display device. Thus, a capacitance may be formed between the first touch block line TBL1 and the touch electrodes in the first touch block TB1. The first touch block line TBL1 may also include a first touch block signal line TBSL1 for transferring the generated touch sensing signal of the first touch block TB1 through the first touch block detection line TBDL1 to be able to simultaneously sense touch electrodes disposed in the first touch block TB1.

Accordingly, when a touch occurs in the first touch block TB1, the touch sensing signal may be generated through the first touch block detection line TBDL1, and the touch sensing signal may be transferred to the touch driving circuit 150 through the first touch block signal line TBSL1.

One touch electrode line TEL may be connected to each touch electrode TE disposed in the first touch block TB1. For example, when 24 touch electrodes TE positioned in 4 rows and 6 columns are disposed in the first touch block TB1, the first touch electrode line TEL1 to the 24$^{th}$ touch electrode lines TEL24, respectively, may be connected to the 24 touch electrodes disposed in the first touch block TB1.

Further, to sense the second touch block TB2 positioned in the same column as the first touch block TB1, the second touch block line TBL2 and the touch electrode line TEL may be disposed. The second touch block TB2 is a touch block disposed in the same column as the first touch block TB1 and may be positioned above or below the first touch block TB1.

The second touch block line TBL2 may include a second touch block detection line TBDL2 that surrounds all the touch electrodes disposed in the second touch block TB2. The second touch block line TBL2 may also include a second touch block signal line TBSL2 for transferring the generated touch sensing signal of the second touch block through the second touch block detection line TBDL2 to be able to simultaneously sense touch electrodes disposed in the second touch block TB2.

Accordingly, when a touch occurs in the second touch block TB2, the touch sensing signal may be generated through the second touch block detection line TBDL2, and the touch sensing signal may be transferred to the touch driving circuit 150 through the second touch block signal line TBSL2.

One touch electrode line TEL may be connected to each touch electrode TE disposed in the second touch block TB2. For example, when 24 touch electrodes TE positioned in 4 rows and 6 columns are disposed in the second touch block TB2, the first touch electrode line TEL1 to the 24th touch electrode lines TEL24, respectively, may be connected to the 24 touch electrodes disposed in the second touch block TB2.

In this case, since the first touch block TB1 and the second touch block TB2 are disposed in the same column, the first touch electrode line TEL1 may be connected to the touch electrodes disposed in the first touch block TB1 and may also be connected to the touch electrodes disposed in the second touch block TB2. Thus, the first touch electrode line TEL may be connected to a plurality of touch electrodes including a first electrode from the first touch block TB1 and a second electrode from the second touch block TB2 where the first electrode and the second electrode are in a same column of touch electrodes TE.

For example, the first touch electrode line TEL1 may be connected to the touch electrodes positioned in the first row and first column of the first touch block TB1 and the touch electrodes positioned in the first row and first column of the second touch block TB2. Thus, a first touch electrode from the first touch block TB1 and a second touch electrode from the second touch block TB2 that are both connected to the first touch electrode line TEL1 have matching positions amongst the other touch electrodes within the respective touch blocks.

As such, when one touch electrode line TEL is shared by a plurality of touch blocks (e.g., TB1 and TB2), all the touch electrodes TE positioned in the same column may be connected to the touch electrode lines TEL corresponding to the number of the touch electrodes TE disposed in one touch block TB regardless of the number of touch blocks TB disposed in the column direction.

For example, when 24 touch electrodes TE positioned in 4 rows and 6 columns are disposed in one touch block, even when a plurality of touch blocks are positioned in the same column, all touch electrodes positioned in the same column may be connected to 24 touch electrode lines TEL1-TEL24.

As compared to the conventional case (FIG. 5), when the first touch block TB1 and the second touch block TB2 are disposed in the same column, 48 touch lines were conventionally required to connect the touch electrodes. However, in the display device 100 of the disclosure, all touch electrodes disposed in the same column may be connected through 24 touch electrode lines TEL1 to TEL24 regardless of the number of touch blocks.

If two touch blocks TB1 and TB2 are disposed in the same column, and 24 touch electrodes TE are disposed in each of the touch blocks TB1 and TB2, the display device 100 of the disclosure may sense the touch electrodes disposed in one column with 26 touch lines including 24 touch electrode lines TEL1 to TEL24 and two touch block signal lines TBSL1 and TBSL2.

As a result, in the display device 100 of the disclosure, the touch block signal lines corresponding to the number of touch blocks disposed in the same column and the touch electrode lines corresponding to the number of touch electrodes positioned in one touch block are disposed, so that it is possible to perform touch sensing while reducing the number of signal lines.

Accordingly, the display device 100 of the disclosure may reduce the number of source-readout integrated circuits SRIC included in the touch driving circuit 150 and enhance touch sensing performance.

Figure 7A:
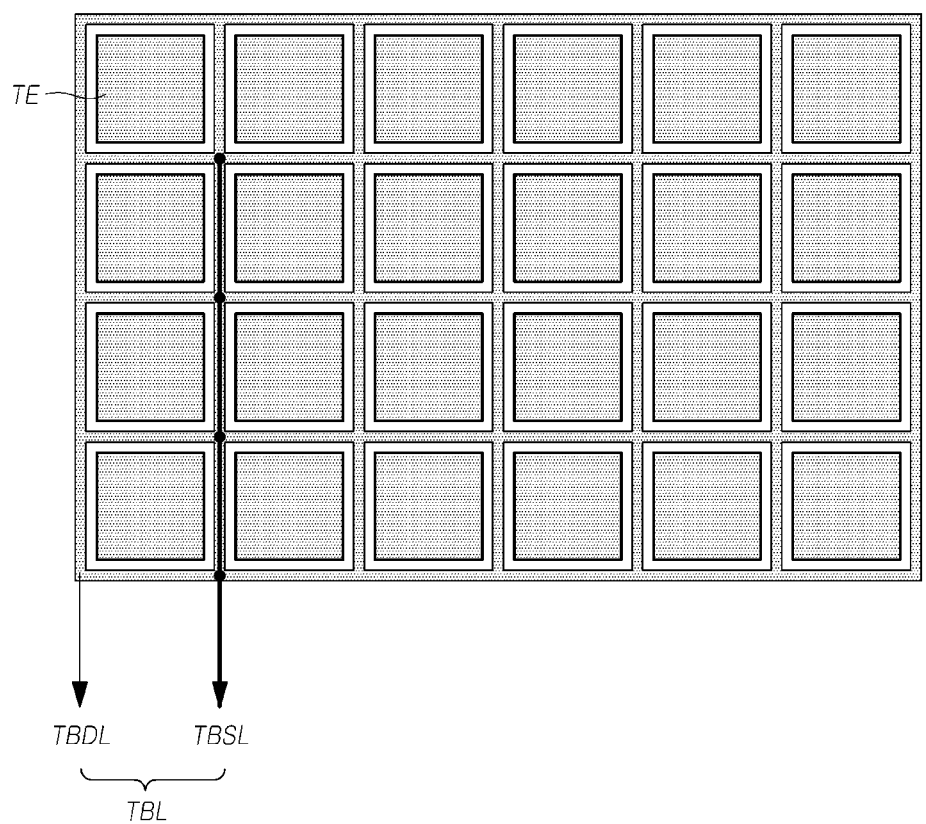

FIGS. 7A and 7B are views illustrating an example of a touch block line TBL formed in a touch block TB in a touch display device according to embodiments of the disclosure. The touch block line TBL shown in FIGS. 7A and 7B are representatives of the touch block line TBL shown in FIG. 6.

Referring to FIGS. 7A and 7B, the display device 100 of the disclosure may include a touch block line TBL for sensing a plurality of touch blocks TB in each block unit and a touch electrode line TEL for sensing the touch electrode TE in each touch block TB.

For example, 24 touch electrodes TE may be disposed in 4 rows and 6 columns in one touch block TB. The number and arrangement of touch electrodes TE disposed in one touch block TB may be varied.

The touch display device 100 of the disclosure may include a touch block line TBL and a touch electrode line TEL as signal lines for sensing one touch block TB. Here, for convenience of understanding, the touch electrode line TEL is omitted and only the touch block line TBL is shown.

The touch block line TBL may include a touch block detection element such as a touch block detection line TBDL that is disposed around all the touch electrodes TE disposed in the touch block TB. The touch block element may be a touch block detection pattern that surrounds the touch electrodes TE in the touch block TB rather than a line. The touch block line TBL may also include a touch block signal line TBSL for transferring the generated touch sensing signal through the touch block detection line TBDL to be able to simultaneously sense touch electrodes TE disposed in the touch block TB.

The touch block detection line TBDL is disposed to simultaneously sense all the touch electrodes TE (e.g., 4×6=24 touch electrodes) disposed in the touch block TB.

For example, the touch block detection line TBDL may be electrically connected to all the touch electrodes TE in the touch block TB while surrounding all the touch electrodes TE disposed in the touch block TB as shown in FIG. 7A. Alternatively, the touch block detection line TBDL may be electrically connected while extending along one side surface (e.g., lower side) of each of all the touch electrodes TE disposed in the touch block TB as shown in FIG. 7B. Here, an example in which the touch block detection line TBDL is electrically connected while surrounding all the touch electrodes TE disposed in the touch block TB is described.

The touch block signal line TBSL may be connected to at least one point of the touch block detection line TBDL through a contact hole and transfers the touch sensing signal generated from the touch block detection line TBDL to the touch driving circuit 150. Thus, the touch block signal line TBSL may be connected to the touch block detection line TBDL at a plurality of points along the touch block detection line TBDL.

The touch block signal line TBSL may be connected to one point of the touch block detection line TBDL but, for reducing time delay of touch sensing signal and effective transmission, be connected to a plurality of points of the touch block detection line TBDL. In particular, all of the touch block signal lines TBSL may be connected to touch block detection lines TBDL crossing within the touch block TB.

Figure 8:
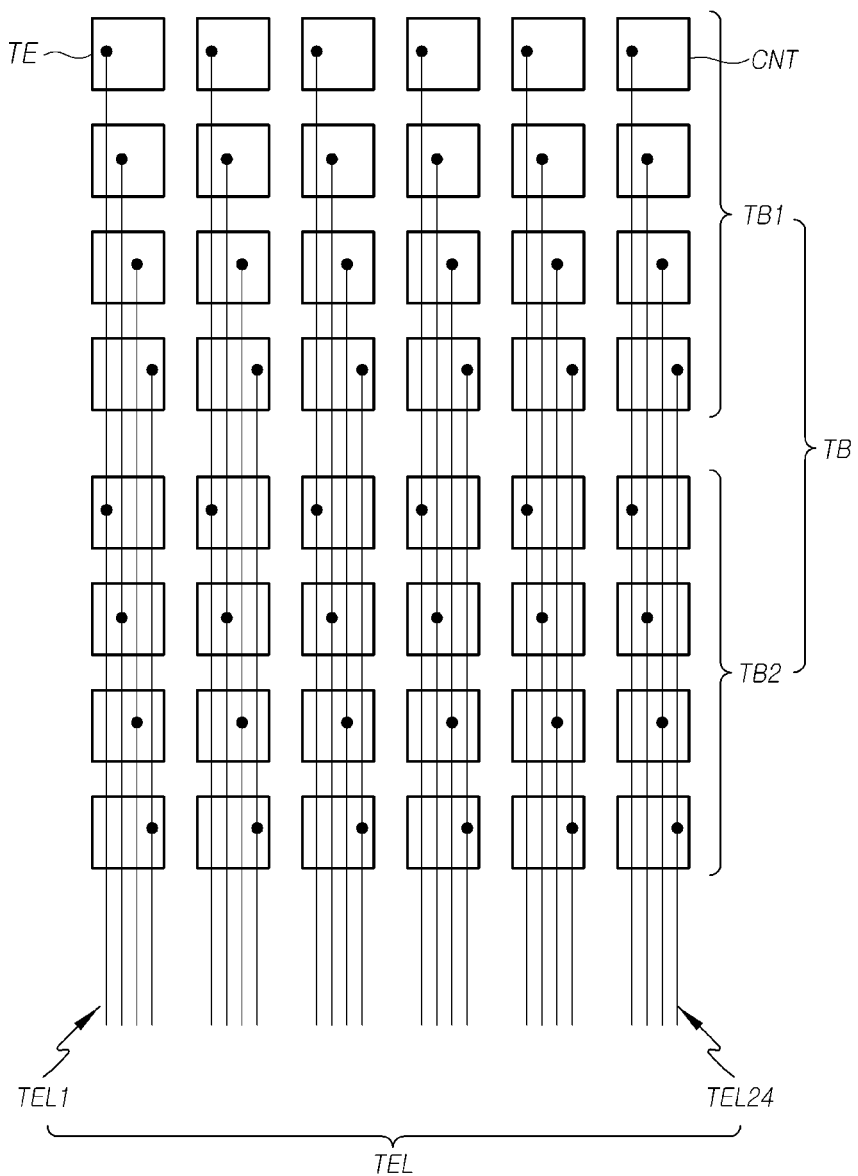
FIG. 8 is a view illustrating an example of a touch electrode line formed in a touch block in a touch display device according to embodiments of the disclosure.

FIG. 8 is a view illustrating an example of a touch electrode line formed in a touch block in a touch display device according to embodiments of the disclosure.

Referring to FIG. 8, the display device 100 of the disclosure may include a touch electrode line TEL for individually sensing the touch electrodes TE in the touch block TB, along with the touch block line TBL.

Here, for convenience of understanding, the touch block line TBL is omitted and only the touch electrode line TEL is shown to more easily explain the touch electrode line TEL. Note that touch electrode line TEL shown in FIG. 8 and the touch block line TBL shown in FIG. 7 are combined to collectively form the touch display device 100 shown in FIG. 6.

One touch electrode line TEL may be connected to each touch electrode TE disposed in each touch block TB. For example, when 24 touch electrodes TE positioned in 4 rows and 6 columns are disposed in the first touch block TB1, the first touch electrode line TEL1 to the 24$^{th}$ touch electrode line TEL24, respectively, may be connected to the 24 touch electrodes TE disposed in the first touch block TB1.

Further, in the display device 100 of the disclosure, a plurality of touch blocks TB may be disposed in the direction in which the touch electrode line TEL extends (e.g., a column direction). For example, the second touch block TB2 may be disposed in the same column as the first touch block TB1 and may be positioned above or below the first touch block TB1.

In this case, since the first touch block TB1 and the second touch block TB2 are disposed in the same column in the direction in which the touch electrode line TEL extends, the touch electrode line TEL may be together connected to the touch electrodes disposed in the first touch block TB1 and the touch electrodes disposed in the second touch block TB2.

For example, the first touch electrode line TEL1 may be connected to the touch electrodes positioned in the first row and first column of the first touch block TB1 and the touch electrodes positioned in the first row and first column of the second touch block TB2. In other words, one touch electrode line TEL may connect all touch electrodes disposed in the same position in each touch block.

As such, if the touch electrodes TE disposed in the same position in the plurality of touch blocks (e.g., TB1 and TB2) are connected by one touch electrode line TEL, all touch electrodes TE disposed in the same position in each touch block TB may be connected by one touch electrode line TEL regardless of the number of touch blocks TB disposed in the column direction.

For example, when 24 touch electrodes TE positioned in 4 rows and 6 columns are disposed in one touch block, even when a plurality of touch blocks are positioned in the same column, since all touch electrodes positioned in the same position are connected by one touch electrode line TEL, it is possible to connect all touch electrodes TE by 24 touch electrode lines TEL1 to TEL24 for each column where the touch block TB is disposed.

As a result, the display device 100 of the disclosure may sense touch blocks TB constituting one column by using the touch block signal lines TBSL corresponding to the number of touch blocks disposed in the same column and the touch electrode lines TEL corresponding to the number of touch electrodes TE positioned in one touch block TB.

Therefore, since the display device 100 of the disclosure may reduce the number of touch lines, it is possible to reduce the number of the source-readout integrated circuits SRICs included in the touch driving circuit 150 or the number of multiplexers included in the source-readout integrated circuit SRIC.

Figure 9:
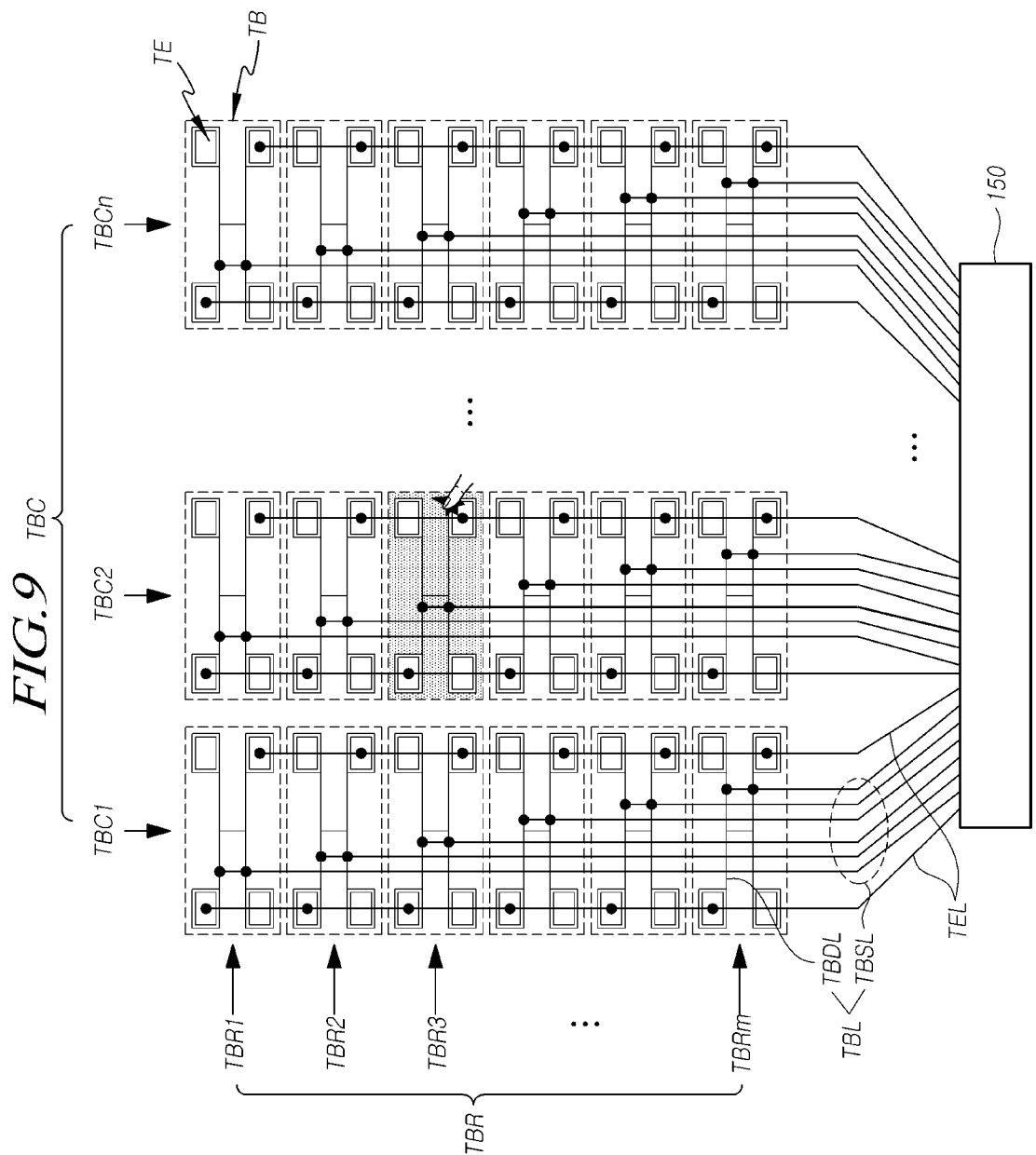
FIG. 9 is a view illustrating an example of a structure of a display panel having a touch block line and a touch electrode line in a touch display device according to embodiments of the disclosure.

FIG. 9 is a view illustrating an example of a structure of a display panel having a touch block line and a touch electrode line in a touch display device according to embodiments of the disclosure.

Referring to FIG. 9, in the touch display device 100 according to embodiments of the disclosure, a touch block TB composed of m touch block rows TBR and n touch block columns TBC may be disposed. In other words, the plurality of touch blocks TB may include m touch block rows TBR1-TBRm and n touch block columns TBC1-TBCn within the display panel 110.

The plurality of touch electrodes TE may be disposed in a matrix form in each touch block TB. For example, in one touch block TB, 24 touch electrodes TE in 4 rows and 6 columns may be disposed in a matrix form.

In the display device 100 of the disclosure, the touch lines may include a touch block line TBL for sensing touch in each unit of touch block TB and a touch electrode line TEL for sensing touch in each unit of touch electrode TE.

The touch block line TBL may include a touch block detection line TBDL disposed around all the touch electrodes TE disposed in the touch block TB and a touch block signal line TBSL for transferring the touch driving signal or touch sensing signal through the touch block detection line TBDL to be able to simultaneously sense touch electrodes TE disposed in the touch block TB.

One touch electrode line TEL may be connected to each touch electrode TE disposed in the touch block TB so as to individually sense the touch electrode TE disposed in the touch block TB. For example, when 24 touch electrodes TE arranged in 4 rows and 6 columns are present in the first touch block TB1, the first touch electrode line TEL1 to the 24$^{th}$ touch electrode line TEL24, respectively, may be connected to the 24 touch electrodes TE disposed in each touch block TB.

In this case, the touch electrode lines TEL extending in the column direction may simultaneously connect the touch electrodes TE disposed in the same position within each touch block TB, for the plurality of touch blocks TB disposed in the same column.

For example, in the m touch blocks disposed in the first touch block column TBC1, the m touch electrodes TE positioned in the first row and first column of each touch block TB may be connected by one touch electrode line TEL. Further, in the m touch blocks disposed in the first touch block column TBC1, the m touch electrodes TE positioned in the first row and second column of each touch block TB may also be connected by another electrode line TEL.

As such, when the touch electrodes TE disposed in the same position in the plurality of touch blocks TB are connected by one touch electrode line TEL, all touch electrodes TE of each touch block column TBC may be sensed in the units of touch electrodes by as many touch electrode lines TEL as the number of the touch electrodes TE included in one touch block TB.

For example, when 24 touch electrodes TE positioned in 4 rows and 6 columns are disposed in one touch block TB, even when a plurality of touch blocks TB are positioned in one touch block column TBC, it is possible to connect all touch electrodes TE of the corresponding touch block column TBC only with 24 touch electrode lines TEL1-TEL24.

In this case, when m touch block rows TBR are disposed on the display panel 110, the touch electrodes TE disposed in the corresponding touch block column TBC may be sensed with 24 touch electrode lines TEL and m touch block signal lines TBSL.

For example, when a touch occurs in the touch blocks in the third row and second column, a change in the touch sensing signal is detected when the touch driving signal is applied to the second touch block column TBC2 via the touch block sensing line TBSL. In this case, it may be determined that a touch has occurred in the third touch block row TBR3 by the touch sensing signal transferred from the touch block signal line TBSL connected to the touch blocks in three rows and two columns. Further, the position of the touch electrode TE where the touch has occurred may be specified by the touch sensing signal transferred from the touch electrode line TEL connected to a specific touch electrode TE among the touch blocks in three rows and two columns.

Accordingly, the display device 100 of the disclosure may reduce the number of touch lines TL and the number of source-readout integrated circuits SRIC included in the touch driving circuit 150 and enhance touch sensing performance.

Figure 10:
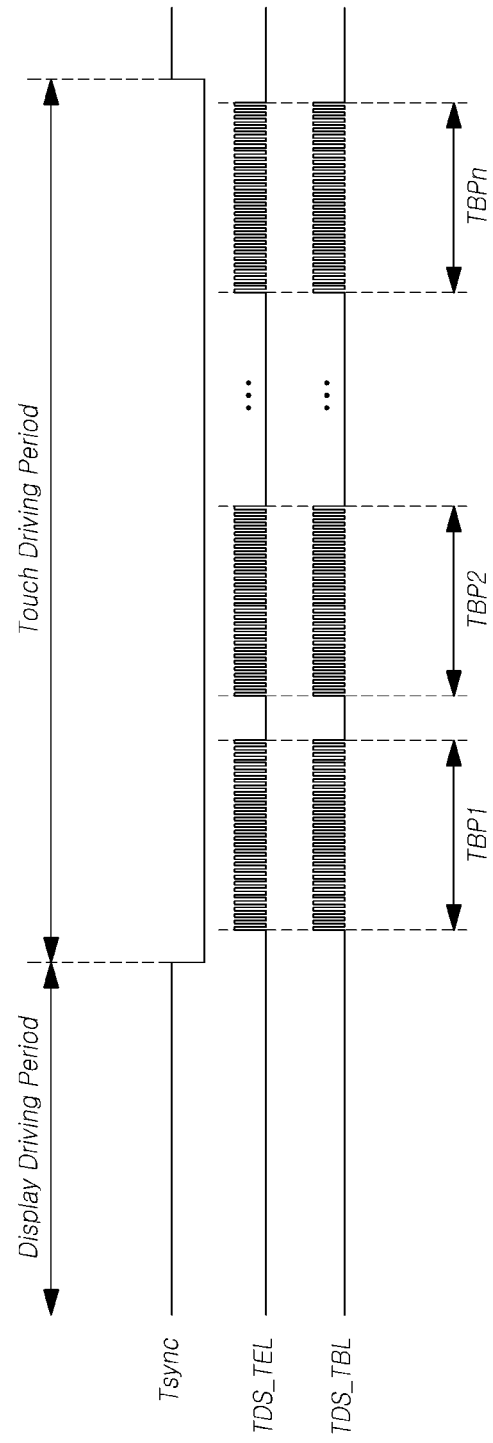
FIG. 10 is a view illustrating an example of a touch signal applied in a display driving period and a touch driving period in a touch display device according to embodiments of the disclosure.

FIG. 10 is a view illustrating an example of a touch signal applied in a display driving period and a touch driving period in a touch display device according to embodiments of the disclosure.

Referring to FIG. 10, the touch display device according to embodiments of the disclosure may perform display driving for image display during a predetermined display driving period within one display frame period and may perform touch driving for sensing a touch input by a finger or a stylus during a predetermined touch driving period (e.g., a touch sensing period). The display driving period and the touch driving period collectively form one display frame period of the display device.

In this case, the touch display device 100 may use the anode electrode or cathode electrode of the light emitting element constituting the subpixel as the touch electrode TE. Therefore, the touch driving circuit may apply a DC voltage to the touch electrode TE during the display driving period, and a pulsed touch signal may be supplied to the touch electrode TE during the touch driving period.

The touch signal may include a touch driving signal for driving the touch electrode TE and a touch sensing signal generated by the touch electrode TE.

The display driving period and the touch driving period may be temporally identical or overlap each other or be temporally separated periods. When the display driving period and the touch driving period are temporally separated may be referred to as time division driving.

When the display driving period and the touch driving period are temporally identical, display driving and touch driving may be performed simultaneously, and such driving scheme may be referred to as time free driving.

In the case of time division driving, the display driving period and the touch driving period may alternate.

As such, when the display driving period and the touch driving period are temporally separated while alternating, the touch driving period may correspond to a blank period when display driving is not performed.

The touch display device 100 may generate a touch synchronization signal Tsync swinging to a high level and a low level, thereby identifying or controlling the display driving period and the touch driving period. In other words, the touch synchronization signal Tsync may be a timing control signal defining the touch driving period.

For example, the high level period of the touch synchronization signal Tsync may correspond to the display driving period. The low level period of the touch synchronization signal Tsync may correspond to the touch driving period.

In this case, the touch driving circuit 150 may apply the touch driving signal TDS to the touch electrode TE during the touch driving period in which the touch synchronization signal Tsync is at the low level and may sense the presence or absence of a touch and the touch position of the passive stylus or the active stylus using the touch sensing signal received from the touch electrode TE.

Meanwhile, in relation to a scheme of allocating a display driving period and a touch driving period within one display frame period, one display frame period may be divided into one display driving period and one touch driving period, and display driving may be performed during one display driving period while touch driving may be performed during one touch driving period which corresponds to a blank period.

In other words, the touch display device 100 may perform driving for a touch once during the display frame period which is one period of the frame frequency or the screen change period (refresh rate) of the display panel 110.

For example, when the frame frequency is 60 Hz, display driving of turning on or off the subpixels through a plurality of gate lines constituting the display panel 110 within a period of 1/60 s is performed, and then, the touch driving for touch sensing may be performed during a predetermined touch driving period. In this case, the touch detection frequency (touch report rate) will be 60 Hz.

As another example, one display frame period may be divided into two or more display driving periods and two or more touch driving periods, and display driving may be performed during two or more display driving periods in one display frame period while touch driving may be performed during two or more touch driving periods.

The display device 100 of the disclosure may apply the touch driving signal to the touch electrodes TE disposed on the display panel 110 through the touch block line TBL and touch electrode line TEL and detect the touch sensing signal generated from the touch electrode TE during the touch driving period which is determined by the touch synchronization signal Tsync.

In this case, the display device 100 may simultaneously apply a first touch driving signal TDS_TBL for sensing touch on a basis of touch block and a second touch driving signal TDS_TEL for sensing touch on a basis of touch electrode to one touch block column TBC.

The first touch driving signal TDS_TBL for sensing touch on a basis of touch block may be applied through the touch block line TBL, and the second touch driving signal TDS_TEL for sensing touch on a basis of touch electrode may be applied through the touch electrode line TEL.

Accordingly, upon sensing touch on the first touch block column TBC1, the first touch driving signal TDS_TBL for sensing touch on a basis of touch block and the second touch driving signal TDS_TEL for sensing touch on a basis of touch electrode may simultaneously be applied, during the first touch block period TBP1 (e.g., a first touch block sensing period), through the touch block line TBL and the touch electrode line TEL connected to the first touch block column TBC1.

Further, upon sensing touch on the second touch block column TBC2, the first touch driving signal TDS_TBL for sensing touch on a basis of touch block and the second touch driving signal TDS_TEL for sensing touch on a basis of touch electrode may simultaneously be applied, during the second touch block period TBP2 (e.g., a second touch block sensing period), through the touch block line TBL and the touch electrode line TEL connected to the second touch block column TBC2. Thus, the touch driving period includes a plurality of touch block sensing periods and the touch electrode columns are sequentially sensed during the plurality of touch block sensing periods.

In one embodiment, multi-touch (e.g., a plurality of touches) of the touch display device 100 may be sensed during a touch sensing period. A plurality of touch driving signals TDS_TBL are simultaneously applied touch block signal lines TBSL that are connected to touch block detection lines TBDL that surround a plurality of touch blocks TB during the touch sensing period. For example, a first touch driving signal TDS_TBL is applied to a first touch block signal line TBSL that is that is connected to a first touch block detection line TBDL that surrounds first touch electrodes TE of a first touch block TB1 during the touch sensing period. A second touch driving signal TDS_TBL is applied to a second touch block signal line TBSL that is connected to a second touch block detection line TBDL that surrounds second touch electrodes TE of a second touch block TB2 while the first touch driving signal TDS_TBL is applied to the first touch block signal line TBSL during the touch sensing period. Thus, the first and second touch driving signals TDS_TBL are simultaneously applied during the touch sensing period. In one embodiment, the first touch block TB1 and the second touch block TB2 are in a same touch block column.

A third touch driving signal TDS_TEL for sensing touch on a basis of touch electrode is applied to a touch electrode line TEL that is connected to a first touch electrode and a second touch electrode that are respectively included in the first touch electrodes TE and the second touch electrodes TE. The third touch driving signal TDS_SEL may be simultaneously applied with the first touch driving signal TDS_TBL and the second touch driving signal TDS_TBL.

A touch of at least one of the first touch block and the second touch block is sensed based on a first touch signal received from the first touch block signal line TBSL and a second touch signal received from the second touch block signal line TBSL during the touch sensing period. Thus, touch of two different touch blocks may be simultaneously sensed.

Furthermore, a touch of at least one of the first touch electrode and the second touch electrode is sensed during the touch sensing period. Accordingly, the touch display device 100 may simultaneously sense a first location associated with the first touch electrode and a second location associated with the second touch electrode that is different from the first location during the touch sensing period.

Such a touch sensing operation on a basis of touch block is possible because the touch display device 100 of the disclosure may reduce the number of all touch lines through the touch block signal lines TBSL connected per touch block and the touch electrode lines TEL connected per touch electrode.

Meanwhile, although a self-capacitance sensing structure, in which the touch driving signal and the touch sensing signal are transferred through the same touch line, has been shown as an example, the same may also apply to the mutual-capacitance sensing structure in which the touch driving signal and the touch sensing signal are transferred through different paths.

For example, in the mutual-capacitance sensing scheme, each touch block row TBR may be configured as a touch driving electrode line, and each touch block column TBC may be configured as a touch sensing electrode line. In this case, touch may be sensed by applying the touch driving signal to all touch blocks positioned in one touch block row TBR and detecting the touch sensing signal through the touch block line TBL and touch electrode line TEL connected to each touch block.

Since the touch display device 100 of the disclosure may reduce the number of touch lines, it is possible to reduce the number of the source-readout integrated circuits SRICs included in the touch driving circuit 150 or the number of multiplexers included in the source-readout integrated circuit SRIC.

FIG. 11 is a block diagram illustrating an example in which a plurality of touch block columns are sensed using one source-readout integrated circuit in a touch display device according to embodiments of the disclosure.

Referring to FIG. 11, since the number of touch lines connected to each touch block column TBC is reduced in the touch display device 100 of the disclosure, touch may be sensed by connecting a plurality of touch electrode columns TBC to one source-readout integrated circuit SRIC.

For example, the touch display device 100 of the disclosure may include a plurality of source-readout integrated circuits SRIC1 and SRIC2 in the touch driving circuit 150.

The source-readout integrated circuit SRIC may be an integrated circuit including a touch driver TDC and a data driver DDC.

In this case, since the number of touch lines connected to each touch block column TBC is reduced in the touch display device 100 of the disclosure, touch lines extending from a plurality of touch electrode columns TBC may be connected to one source-readout integrated circuit SRIC.

Here, the touch lines may include touch block lines TBL connected per touch block TB and touch electrode lines TEL connected per touch electrode TE.

For example, when the first source-readout integrated circuit SRIC1 simultaneously senses the first touch block column TBC1 to eighth touch block column TBC8, the touch lines TL1-TL8 extending from the first touch block column TBC1 to the eighth touch block column TBC8 may be connected to the first source-readout integrated circuit SRIC1.

Further, the touch lines TL9-TL16 extending from the ninth touch block column TBC9 to $16^{th}$ touch block column TBC16 may be connected to the second source-readout integrated circuit SRIC2.

In this case, the number of touch block columns TBC connected to one source-readout integrated circuit SRIC may vary depending on the number of touch blocks TB and the number of touch electrodes TE constituting the touch block TB.

Embodiments of the disclosure described above are briefly described below.

A touch display device 100 according to embodiments of the disclosure may comprise a display panel having touch blocks TB disposed in a touch block row TBR in a first direction and in a touch block column TBC in a second direction, the touch blocks TB including a plurality of touch electrodes TE, a plurality of touch lines TL connected to the plurality of touch electrodes TE to transfer a touch signal, and a touch driving circuit 150 sensing a touch by the touch signal transferred through the plurality of touch lines TL. The plurality of touch lines TL may include a touch block line TBL for sensing a touch on a basis of touch block, and a touch electrode line TEL for sensing a touch on a basis of touch electrode.

The touch block line TBL may include a touch block detection line TBDL disposed to simultaneously sense a plurality of touch electrodes TE included in the touch block, and a touch block signal line TBSL transferring a generated touch signal through the touch block detection line TBDL to the touch driving circuit 150.

The touch block detection line TBDL may be disposed on at least one side surface of all touch electrodes TE included in the touch block TB.

The touch block detection line TBDL may be disposed to surround all the touch electrodes TE included in the touch block TB.

The touch block signal line TBSL may be electrically connected with the touch block detection line TBDL through at least one contact hole CNT.

One touch electrode line TEL may be connected to each touch electrode TE included in the touch block TB.

The touch electrode line TEL may be electrically connected with every plurality of touch blocks TB disposed in the same touch block column TBC.

The touch electrode line TEL may be electrically connected to a touch electrode TE in the same position, every plurality of touch blocks TB disposed in the same touch block column TBC.

The touch driving circuit 150 may sense a touch on a basis of touch block column TBC during a touch driving period.

The touch driving circuit 150 may simultaneously apply a touch signal to the touch block line TBL and the touch electrode line TEL connected to the same touch block column TBC.

The touch driving circuit 150 may include a plurality of touch drivers TDC. Each touch driver TDC may drive a plurality of touch block column TBC.

Further, a display panel 110 of the disclosure may comprise a plurality of touch blocks TB including a plurality of touch electrodes TE and disposed in a touch block row TBR in a first direction and a touch block column TBC in a second direction, a touch block line TBL for sensing a touch on a basis of touch block, and a touch electrode line TEL for sensing a touch on a basis of touch electrode.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

What is claimed:

1. A touch display device, comprising:
    a display panel including a plurality of touch electrodes arranged into a plurality of touch blocks, each of the plurality of touch blocks including a respective portion of the plurality of touch electrodes that are arranged in a plurality of adjacent rows of touch electrodes and a plurality of adjacent columns of touch electrodes within the touch block;
    a plurality of touch lines including a plurality of touch block lines connected to the plurality of touch blocks and a plurality of touch electrode lines connected to the plurality of touch electrodes, the plurality of touch block lines not being connected to the plurality of touch electrodes and the plurality of touch electrode lines; and
    a touch driving circuit configured to sense a touch of a first touch block from the plurality of touch blocks based on a first touch signal received from a touch block line from the plurality of touch block lines that is connected to the touch block, and sense a touch of a touch electrode from the plurality of touch electrodes included in the touch block based on a second touch signal received from a touch electrode line from the plurality of touch electrode lines that is connected to the touch electrode in the first touch block and connected to another touch electrode in a second touch block,
    wherein the sensed touch of the touch electrode indicates a location of the touch within the first touch block,
    wherein each of the plurality of touch block lines includes a touch block detection line and a touch block signal line connected to the touch block detection line,
    wherein the first touch block and the second touch block are spaced from each other in a column direction,
    wherein a first touch block detection line surrounds at least a portion of the touch electrodes included in the first touch block, and a second touch block detection line surrounds at least a portion of the touch electrodes included in the second touch block, and
    wherein one of the plurality of touch electrode lines is connected to one first touch electrode among the touch electrodes included in the first touch block and one second touch electrode among the touch electrodes included in the second touch block.

2. The touch display device of claim 1, wherein the plurality of touch block lines include:
    a plurality of touch block detection lines to simultaneously sense the plurality of touch electrodes in the plurality of touch blocks; and
    a plurality of touch block signal lines configured to transfer a plurality of first touch signals from the plurality of touch block detection lines to the touch driving circuit.

3. The touch display device of claim 2, wherein the plurality of touch block detection lines are on at least one side surface of the plurality of touch electrodes included in the plurality of touch blocks.

4. The touch display device of claim 2, wherein each of the plurality of touch block signal lines is electrically connected to a corresponding touch block detection line from the plurality of touch block detection lines through at least one contact hole.

5. The touch display device of claim 1, wherein each of the plurality of touch electrode lines is connected to at least two touch electrodes included in the plurality of touch blocks.

6. The touch display device of claim 5, wherein the one first touch electrode and the one second touch electrode in a same column of touch electrodes.

7. The touch display device of claim 5, wherein the one first touch electrode and the one second touch electrode in a same position as each other within the first touch block and the second touch block, respectively.

8. The touch display device of claim 1, wherein the plurality of touch blocks are arranged into a plurality of touch block columns, and the touch driving circuit is configured to sense a touch of a touch block column from the plurality of touch block columns during a touch driving period.

9. The touch display device of claim 8, wherein the touch driving circuit is configured to simultaneously apply a first touch driving signal to a touch block line from the plurality of touch block lines that is connected to a touch block column, and a second touch driving signal to a touch electrode line connected to at least one touch electrode included in the touch block column.

10. The touch display device of claim 1, wherein the touch driving circuit includes a plurality of touch drivers, each of the plurality of touch drivers configured to drive two or more of the plurality of touch block columns.

11. A touch display device comprising:
a display panel including a plurality of touch blocks comprising a first touch block including a first plurality of touch electrodes that are arranged in a plurality of first adjacent rows of touch electrodes and a plurality of first adjacent columns of touch electrodes within the first touch block and a second touch block including a second plurality of touch electrodes that are arranged in a plurality of second adjacent rows of touch electrodes and a plurality of second adjacent columns of touch electrodes within the second touch block, the first touch block and the second touch block being spaced from each other in a column direction;
a first touch block detection line surrounding at least a portion of the first plurality of touch electrodes included in the first touch block;
a first touch block signal line connected to the first touch block detection line;
a plurality of touch electrode lines, each touch electrode line connected to a touch electrode from the first plurality of touch electrodes and a touch electrode from the second plurality of touch electrodes; and
a touch driving circuit configured to sense a touch of the first touch block based on a first touch signal received from the first touch block signal line, and sense a touch of a first touch electrode from the first plurality of touch electrodes based on a second touch sensing signal received from a touch electrode line that is connected to the first touch electrode included in the first touch block and a second touch electrode from the second plurality of touch electrodes included in the second touch block,
wherein the sensed touch of the first touch electrode indicates a location of the touch within the first touch block, and
wherein the first touch block detection line and the first touch block signal line are not connected to the first plurality of touch electrodes and the plurality of touch electrode lines,
wherein one of the plurality of touch electrode lines is connected to one first touch electrode included in the first touch block and one second touch electrode included in the second touch block.

12. The display device of claim 11, further comprising:
a second touch block detection line surrounding at least a portion of the second plurality of touch electrodes included in the second touch block; and
a second touch block signal line connected to the second touch block detection line,
wherein the touch driving circuit is configured to sense a touch of the second touch block based on a third touch signal received from the second touch block signal line, and sense a touch of the second touch electrode from the second plurality of touch electrodes based on a fourth touch sensing signal received from the touch electrode line connected to the first touch electrode and the second touch electrode.

13. The display device of claim 11, wherein the first touch block signal line is connected to the first touch block detection line at a plurality of points along the first touch detection line.

14. The display device of claim 11, wherein the first touch block detection line surrounds all of the first plurality of touch electrodes included in the first touch block in a plan view of the display device.

15. The display device of claim 11, wherein the first touch electrode and the second touch electrode are connected to a same touch electrode line from the plurality of touch electrode lines and included in a same column of touch electrodes from amongst the first plurality of touch electrodes and the second plurality of touch electrodes.

16. The display device of claim 11, wherein the plurality of touch blocks are arranged in a plurality of columns of touch blocks, and the first touch block and the second touch block are in a same column from the plurality of columns of touch blocks.

17. The display device of claim 16, wherein the touch driving circuit is configured to simultaneously apply a first pulsed touch driving signal to the first touch block signal line connected to the first touch block, and a second pulsed touch driving signal to the touch electrode line that is connected to the first touch electrode and the second touch electrode during a touch driving period during which touch of the display device is sensed.

18. A method of sensing touch of a touch display device, the method comprising:
applying a first pulsed touch driving signal to a first touch block signal line during a touch sensing period of the touch display device, the first touch block signal line connected to a first touch block detection line that surrounds at least a portion of first touch electrodes included in a first touch block where the first touch electrodes are arranged in a plurality of first adjacent rows of touch electrodes and a plurality of first adjacent columns of touch electrodes within the first touch block;
applying a second pulsed touch driving signal to a second touch block signal line while the first pulsed touch driving signal is applied to the first touch block signal line during the touch sensing period, the second touch block signal line connected to a second touch block detection line that surrounds at least a portion of second touch electrodes included in a second touch block where the second touch electrodes are arranged in a plurality of second adjacent rows of touch electrodes and a plurality of second adjacent columns of touch electrodes within the second touch block, the second touch block being spaced from the first touch block in a column direction;
applying a third pulsed touch driving signal to a touch electrode line that is connected to a first touch electrode included in the first touch electrodes of the first touch block and a second touch electrode included in the second touch electrodes of the second touch block during the touch sensing period;
sensing a touch of at least one of the first touch block and the second touch block based on a first touch signal received from the first touch block signal line and a second touch signal received from the second touch block signal line during the touch sensing period; and sensing a touch of at least one of the first touch electrode and the second touch electrode during the touch sensing period, wherein the sensed touch of the first touch electrode or the second touch electrode indicates a location of the touch within the first touch block or the second touch block, wherein the first touch block signal line, the first touch block detection line, the second touch block signal line, and the second touch block detection line are not connected to the first touch electrodes, the second touch electrodes, and the touch electrode line, and wherein the touch electrode line is connected to one first touch electrode included in the first touch block and one second touch electrode included in the second touch block.

19. The method of claim 18, wherein the first pulsed touch driving signal is a same as the second pulsed touch driving signal.

20. The method of claim 18, wherein the touch of the first touch electrode corresponds to a first location and the touch of the second touch electrode corresponds to a second location that is different from the first location.

21. The method of claim 20, wherein the first pulsed touch driving signal and the third pulsed touch driving signal are simultaneously applied to the first touch block signal line and the touch electrode line.

22. The method of claim 21, wherein the display device includes a plurality of touch blocks arranged in a plurality of columns of touch blocks and the touch sensing period includes a plurality of touch block sensing periods, and the method further comprising:

during each of the plurality of touch block sensing periods, sensing a column of touch blocks from the plurality of columns of touch blocks that corresponds to the touch block sensing period.

23. The method of claim 22, wherein the plurality of columns of touch blocks are sequentially sensed during the plurality of touch block sensing periods.

* * * * *